United States Patent
Seaman et al.

(10) Patent No.: US 9,137,331 B2
(45) Date of Patent: Sep. 15, 2015

(54) ADAPTIVE REPLICATION

(75) Inventors: David Robert Seaman, Mississauga (CA); Blair James Wall, Toronto (CA); Christopher Carl Capson, Pickering (CA)

(73) Assignee: Metalogix International GMBH, Schaffhausen (CH)

( * ) Notice: Subject to any disclaimer, the term of this patent is extended or adjusted under 35 U.S.C. 154(b) by 237 days.

(21) Appl. No.: 13/184,055

(22) Filed: Jul. 15, 2011

(65) Prior Publication Data

US 2013/0018987 A1    Jan. 17, 2013

(51) Int. Cl.
*G06F 15/16* (2006.01)
*H04L 29/08* (2006.01)

(52) U.S. Cl.
CPC .......... *H04L 67/327* (2013.01); *H04L 67/1095* (2013.01)

(58) Field of Classification Search
None
See application file for complete search history.

(56) References Cited

U.S. PATENT DOCUMENTS

| | | | |
|---|---|---|---|
| 5,649,196 A | 7/1997 | Woodhill | |
| 5,832,514 A * | 11/1998 | Norin et al. | 1/1 |
| 6,101,194 A * | 8/2000 | Annapareddy et al. | 370/447 |
| 7,653,668 B1 * | 1/2010 | Shelat et al. | 707/610 |
| 7,752,630 B2 * | 7/2010 | Murray et al. | 718/105 |
| 7,788,223 B2 * | 8/2010 | Liu et al. | 707/618 |
| 8,117,173 B2 | 2/2012 | Gurivich | |
| 8,412,676 B2 | 4/2013 | Gwozdz | |
| 2007/0177587 A1 * | 8/2007 | Gardner | 370/389 |
| 2008/0285496 A1 * | 11/2008 | Fuchs et al. | 370/311 |
| 2009/0203451 A1 * | 8/2009 | Gatto et al. | 463/42 |
| 2010/0049720 A1 * | 2/2010 | Sharp et al. | 707/10 |
| 2010/0076925 A1 * | 3/2010 | Honigfort | 707/609 |
| 2010/0257403 A1 * | 10/2010 | Virk et al. | 714/15 |
| 2011/0196900 A1 * | 8/2011 | Drobychev et al. | 707/812 |
| 2012/0084383 A1 * | 4/2012 | Bernbo et al. | 709/213 |
| 2012/0246276 A1 * | 9/2012 | Matsubara et al. | 709/219 |

* cited by examiner

*Primary Examiner* — Joon H Hwang
*Assistant Examiner* — Abdulkader M Alriyashi
(74) *Attorney, Agent, or Firm* — Cesari & Reed LLP; Kirk A. Cesari; Christian W. Best

(57) ABSTRACT

This disclosure is related to systems, devices, and methods of adaptive replication. Adaptive replication can allow a node in a network to optimally determine where, when, and how to retrieve data from other nodes in the network. For example, adaptive replication may include receiving a notification corresponding to data at a first node in the network and selecting a node of multiple nodes in the network to retrieve the data from. The first node may retrieve the data from any node within the network that has the data. In some embodiments, a node may add delays or select where to retrieve data from based on a priority, a bandwidth, or other factors.

17 Claims, 4 Drawing Sheets

ADAPTIVE REPLICATION

BACKGROUND

The present disclosure is generally related to synchronization of data at nodes of a network. Since some networks may be challenged because of bandwidth, latency, packet loss or just general network availability, a network may not be able to support synchronization of data over the network. Further, synchronization of a node from one node to another can sometimes be inefficient and time consuming. There may also be problems when a node is required to synchronize to another node and has lost communication. The present disclosure presents solutions to these and other problems.

SUMMARY

This disclosure is related to systems, devices, and methods of adaptive replication. Adaptive replication can allow a node in a network to optimally determine where, when, and how to retrieve data from other nodes in the network. For example, adaptive replication may include receiving a notification corresponding to data at a first node in the network and selecting a node of multiple nodes in the network to retrieve the data from. The first node may retrieve the data from any node within the network that has the data. In some embodiments, a node may add delays or select which node to retrieve data from based on a priority, such as a priority associated with the data, the network, or a node. The node may also use a network bandwidth, latency, or any other system metric to determine where the optimal location is to retrieve the data. The node can also be configured to use different metrics depending on time of day or any other conditions that might change.

A device for adaptive replication may include an interface for receiving and sending data; a memory; and a controller configured to implement adaptive replication. The controller may be configured to receive a notification at a first node, the notification indicating that data is available for the first node to retrieve, the notification received from a second node. The controller may also be configured to select a node of multiple nodes in the network to retrieve the data from, where the first node may retrieve the data from any node within the network that has the data, including the second node and retrieve the data from the selected node when the first node requests the data.

Another device for adaptive replication may include computer readable instructions stored in a memory that, when the instructions are executed by a processor, cause the processor to receive a notification, the notification indicating that data is available for the device to retrieve, the notification received from a second device. The instructions may further cause the processor to select a node of multiple nodes in a network to retrieve the data from, where the device may retrieve the data from any node within the network that has the data; and retrieve the data from the selected node when the first node requests the data.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

Figure 1:
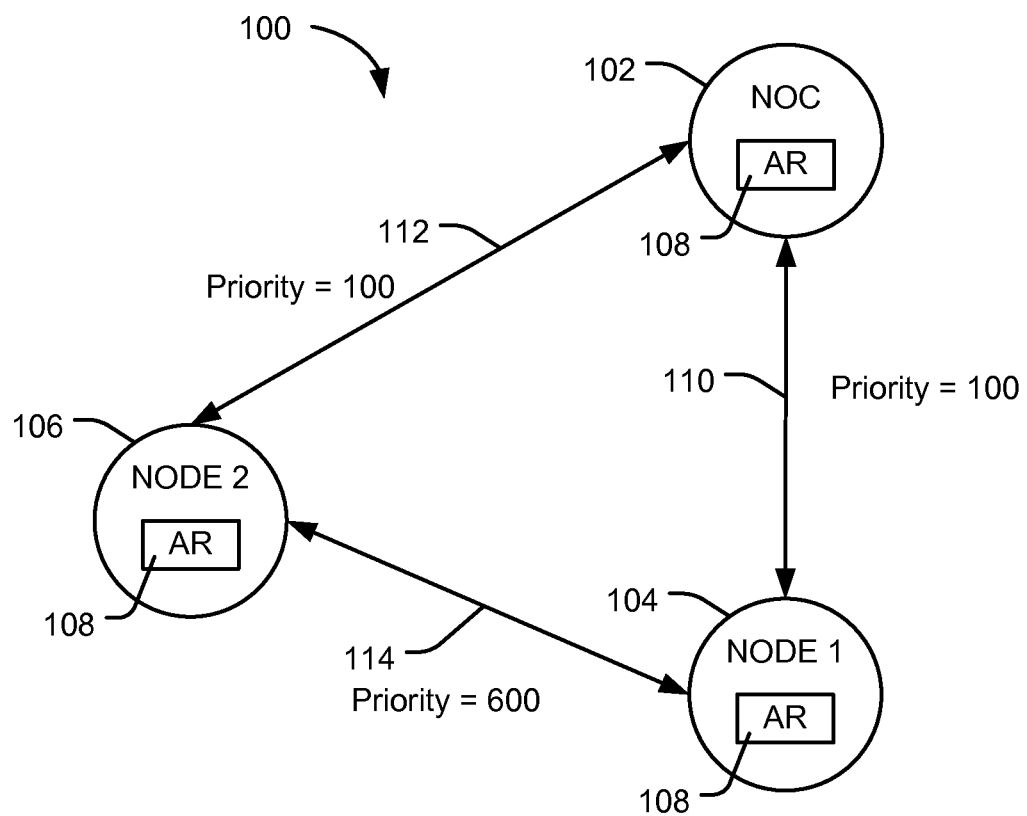
FIG. 1 is a diagram of an illustrative embodiment of a system for adaptive replication.

Referring to FIG. 1, a particular embodiment of a system for adaptive replication is shown and generally designated 100. The system 100 can include a node, such as nodes 102, 104, or 106, that includes an adaptive replication module 108. The nodes 102, 104, and 106 may be computers, servers, or other devices that communicate with each other via one or more networks, such as networks 110, 112, and 114. One or more of the nodes 102, 104, and 106 may be a network operations center (NOC), though a NOC is not necessary. For example, node 102 may be a NOC that supports a fleet of ships, where node 104 represents a first ship and node 106 represents a second ship.

The networks 110, 112, and 114 may be wireless networks or wired networks and each network may have different characteristics. For example, the networks 110, 112, and 114 may have different data transfer rates, physical distances, data bandwidth, support capabilities, hardware components, processing speeds, methods used to convey data, or other characteristics. In some examples, at least one of the networks 110, 112, and 114 may have a low bandwidth that makes synchronization of data relatively slow or impractical.

The adaptive replication module(s) 108 allows the nodes 102, 104, and 106 to synchronize data between the nodes and perform the operations described herein. The adaptive replication module(s) allow for flexible synchronization of data, where in some instances, a node is not pre-determined to synchronize with a specific other node. The adaptive replication module may dynamically determine an optimal method and node to synchronize to. The adaptive replication module(s) may include hardware circuitry, software, or any combination thereof.

A package may be any object that could be synchronized between nodes of a network and may consist of one or more objects. For example, a package may be a manifest, local or remote differential compression information, a replication package, another object, or any combination thereof.

In a particular embodiment, when a package or manifest, which may consist of data representing events that have occurred at a node (such as file updates, etc.) is created, the node 102 can log information (such as events) that correspond to a package, such as time, object identification (such as an identifier of a file an event happened to), event identification (such as a pointer to a type of event), a locator (such as a uniform resource locator (URL) or an unique key), or any other metadata about an object, i.e. a check-out or published status. Further, a manifest may include a list of events corresponding to an object. For example, the manifest may be metadata containing information about a corresponding package or object, or a command that should be executed. In an example, a manifest identification may be similar to a corresponding package identification, such as the same identification value or number with a different extension. For example, a task modified on a specific date can have an event identification that is included in a manifest.

After a package or manifest is created or modified, the adaptive replication module 108 may tell other connected modules that the specific package is needed at their location. The notification of the existence of the specific package can be a short and efficient transmission to other nodes and may contain the package identification and a list of locations that are known (at that time) to store the particular package. The list of locations can include, at minimum, the originating node plus any other nodes that the originating node is aware of having the package. The originating node may log which other nodes have been notified about the specific package.

Nodes that have received the notification of the existence of a specific package can log the existence of the specific package locally. However, each receiving node may first check to see if it has already been notified of that particular package by another node. If the receiving node is already aware of the existence of the package, there is no need to add a log for the existence of the package, and it can add this node to its list of locations that has the package or manifest. However, the receiving nodes can store a list of known locations that the package or manifest could be found at, which at minimum should include the node that just notified the receiving node about the package.

After a node is aware of the existence of a package that needs to be received, the node may fetch the metadata about the package by doing a sequence of bits requests for the corresponding manifest. For example, the node may fetch blocks of the manifest from the notifying node directly, fetch blocks of the manifest from different known sources, such as in a distributed file sharing system, or fetch blocks using another file transfer technology, such as the Binary Intelligent Transfer Service (BITS). Fetching the manifest over a system such as BITS can help when transmitting over a low bandwidth network.

Once the manifest has arrived, the adaptive replication module 108 of the receiving node can examine the contents of the manifest to determine what further action may be required. The manifest could contain a command to be executed, or a reference to a package to be fetched. The node can also double check to see if the events or command indicated in the manifest have already been processed or are needed at the receiving node. The receiving node may also notify all the other nodes of a replication group that have not received this package or manifest that it is required. In some instances, the receiving node can notify other nodes of the replication group when the package or manifest has been downloaded, the manifest has been received, or both, even if the other nodes might be able to fetch the package or the manifest from somewhere else.

After the manifest has been received and the adaptive replication module 108 of the receiving node determines the package corresponding to the received manifest needs to be fetched, the adaptive replication module 108 can fetch the corresponding package, but the adaptive replication module 108 may decide where to retrieve it from based on known locations, which may have been received with the notification of the existence of the package. The adaptive replication module 108 may also determine where to fetch the package from based on preferred network connections or a round-robin attempt to locate the package at other nodes. For example, the package being retrieved should be on the source node, but if it is not there or not available, the retrieving node can look for the package at other nodes by requesting from another node in the replication group and eventually one of them should have the package even if the requesting node is not aware of it.

When the package arrives at the requesting node that fetched it, the package can be processed and the events of the package may be applied to the associated data stored at the receiving node as needed. Once the package or manifest arrives, the node can then notify other nodes that it has the package available for anybody that needs it. In some instances, the node may notify all other nodes that it has the package available.

Figure 2:
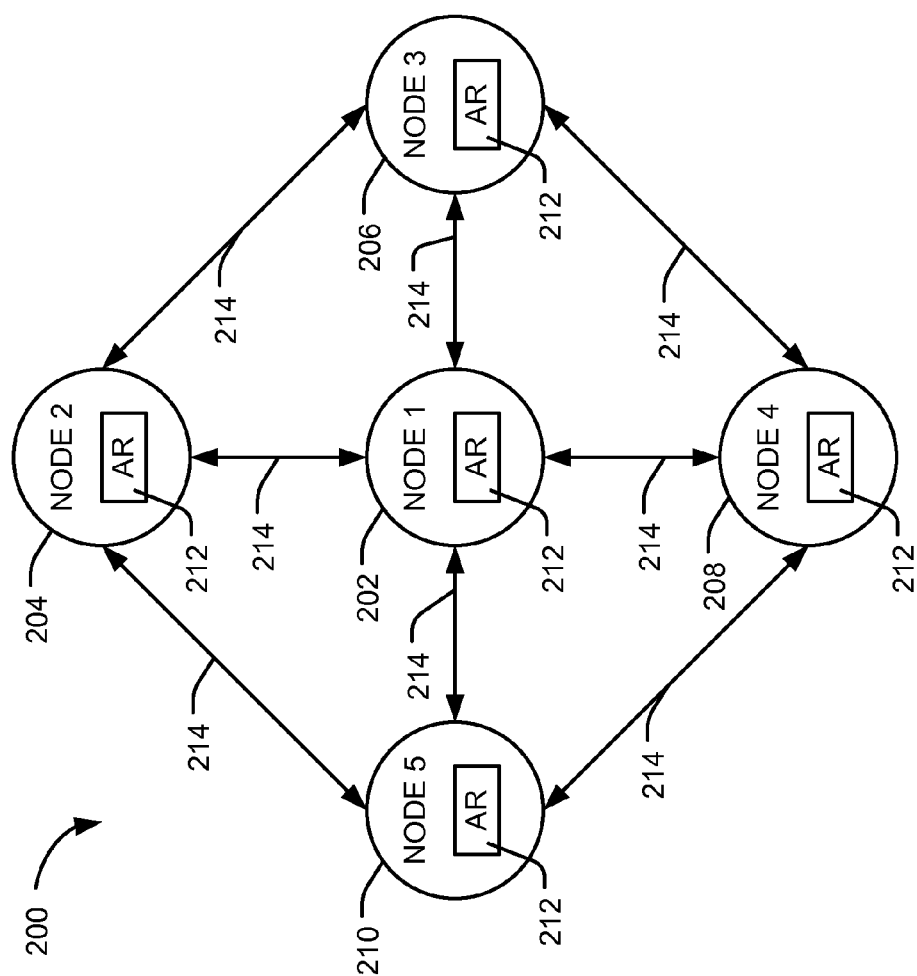
FIG. 2 is a diagram of another illustrative embodiment of a system for adaptive replication.

Referring to FIG. 2, a particular embodiment of a system for adaptive replication is shown and generally designated 200. System 200 is another example of a network topology that may be used in an adaptive replication system. The system 200 can include multiples nodes, such as nodes 202, 204, 206, 208, and 210, having an adaptive replication module 212. A node may be a general purpose computing device, a special purpose computing device, or any other appropriate device that can connect to a network. For example, a node may be a personal computer, a laptop computer, a desktop computer, a server, a phone, a tablet computer, a media player, or any other device that is capable of connecting to a network and implementing the systems or methods described herein. The network 214 may correspond to any connectivity topology including, but not limited to: a direct wired connection (e.g. parallel port, serial port, USB, IEEE 1394, etc.), a wireless connection (e.g. IR port, Bluetooth port, etc.), a wired network, a wireless network (e.g. 802.11x, cellular, etc.) a local area network, a wide area network, an ultra-wide area network, an internet, an intranet, and an extranet.

A node, such as node 202, etc., may include an adaptive replication module 212 that can be implemented as software or firmware to be executed by a processor. The adaptive replication module 212 can perform the same functions as the adaptive replication module 108 shown in FIG. 1. The adaptive replication module 212 could also be implemented as a hardware circuit or a combination of hardware circuit and software. Generally, a node may include a memory having a cache (not shown), a processing device (not shown), and an interface (not shown) to transmit or receive over the network 214. The memory may be volatile or non-volatile memory, or any combination of the thereof. A node may also have additional features or functionality and may include input or output devices. For example, a node may include an operating system that may execute one or more application programs, or modules, that reside in a memory, such as the adaptive replication module 212.

Figure 3:
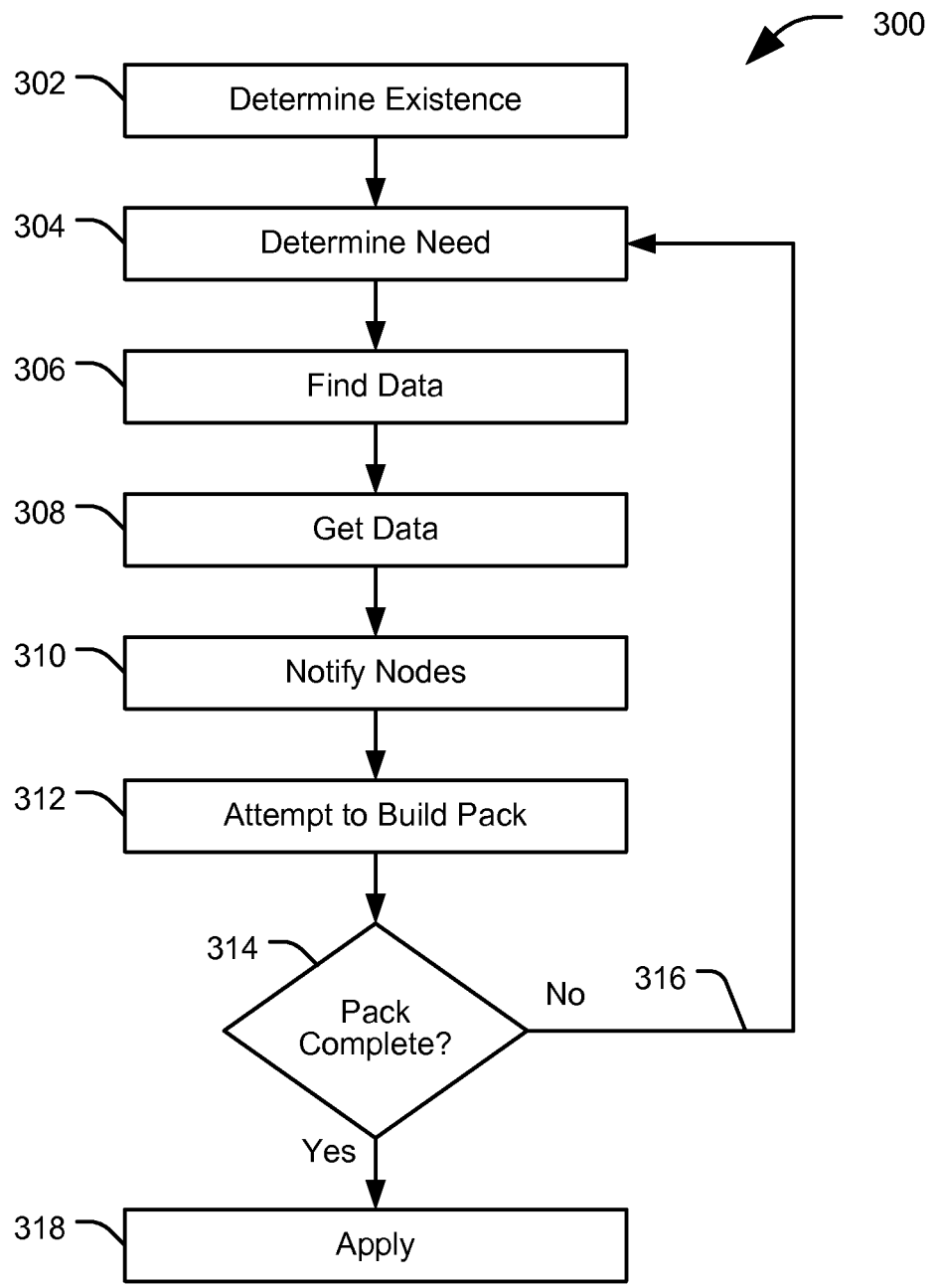
FIG. 3 is a flowchart of an illustrative embodiment of a method for adaptive replication.

Referring to FIG. 3, a flowchart of an illustrative embodiment of a method for adaptive replication is shown and generally designated 300. The method 300 is generally applicable to synchronize data objects (such as files) between one node in a network to another node in the network, such as nodes 102-106 shown in FIG. 1 or nodes 202-212 shown in FIG. 2. The method 300, and adaptive replication, can be particularly useful for networks with low-available bandwidth, such as a network with an overall low-bandwidth or a network with restrictions on bandwidth such as a network with a bandwidth allotment per user or per data transfer or per connection.

The method 300 may be executed by a node and can determine an existence of a package, at 302, such as a package that indicates a file was updated at another node. A package may include an indicator for the existence of the package, a manifest detailing a list of events or actions that relate to the package, and details (e.g. data) corresponding to the events. Once a node learns of the existence of a package, the node may determine whether that node needs the details or data of the package, at 304. The node may determine the need based on a comparison of files or other data already stored at the node. When the node determines it needs the data, the node may determine where to find the package, at 306.

The node may find or retrieve the package from the node that sent the notification that the package existed or may find or retrieve the package from a different node. Where a node retrieves a package from may be determined based on one or more factors, such as a preferred connection, a preferred node, a bandwidth of a connection, a speed of a connection, other factors, or any combination thereof.

Once a node determines where to retrieve the package or manifest from, the node may get the data from the selected node, at 308. The node may also notify other nodes that it now has the package, at 310; for example, if any of the other nodes also need that package. Notifying the other nodes may be done at another time in the method 300, as long as the node sending the notice actually has the package. Though, in another example, a node may send a location or pointer for a package that may be located at another node. When data corresponding to the package has been received, the method 300 may attempt to build the package, at 312. This may include applying updates to a file or folder or other changes at the node. If the package is not complete, at 314; for example, as described in a manifest of the package, the method 300 may repeat the process, at 316, to determine what is still needed to complete the package, at 304.

When the package is complete, at 314, the method 300 and the node may apply the package, at 318. For example, the details and data of the package may be applied to make changes to files or folders at the node or make other changes. In some examples, a node, once it has received notification of the existence of a package may choose to retrieve the package immediately or at a later time. Further, each node in a network may choose for itself what is the best way and location to retrieve a package.

Figure 4:
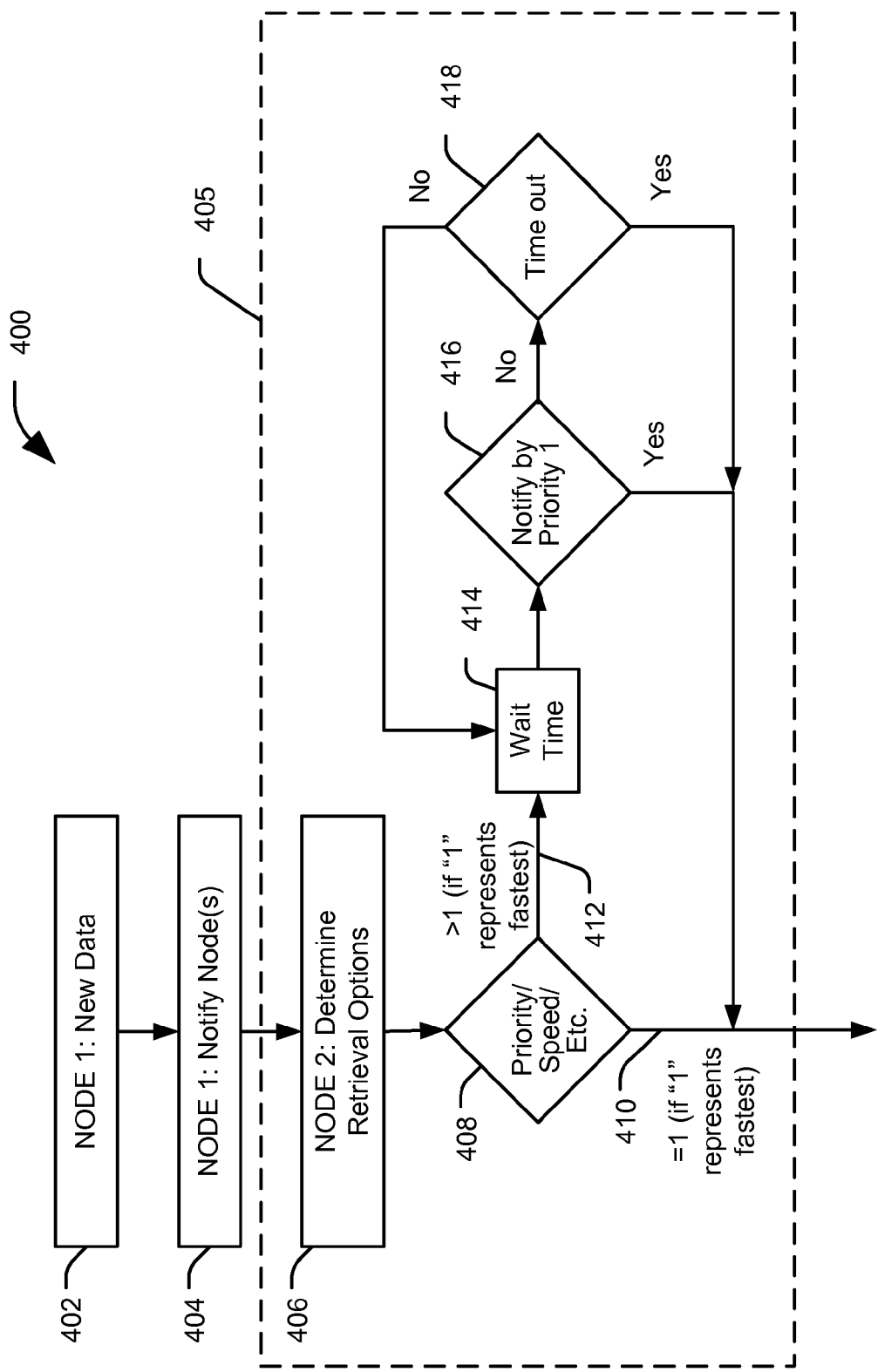
FIG. 4 is a flowchart of another illustrative embodiment of a method for adaptive replication.

Referring to FIG. 4, a flowchart of an illustrative embodiment of a method for adaptive replication is shown and generally designated 400. When a node has new data or a package available, at 402, it may notify other nodes of the existence of the data or package, at 404. After receiving the notification of the data or package, a node may implement a process 405 to find and determine where and when to retrieve the data or the package associated with a notification, such as discussed with respect to step 306 shown in FIG. 3.

The node may find a location of the data or packet that needs retrieving, at 406, based on a list of nodes that the retrieving node is aware has the needed data or packet. Another way a retrieving node could find a location of a needed packet would be to poll other nodes to determine if another node has the packet or knows of a location of the packet. For example, a retrieving node may perform a round-round polling of other nodes until it locates the needed data or packet.

The node may select where to retrieve the needed data or packet from based on one or more factors including, but not limited to: an assigned priority of a node, an assigned priority of the data or package, a bandwidth of a network connection between nodes, a determined speed of a connection, an expected transfer speed, a determined transfer speed, a number of connections, other network metrics, any other factor, or any combination thereof.

Once a node determines where to retrieve needed data or a packet from, the node may determine when to retrieve the data, at 408. When to retrieve the data may be pre-determined or may be calculated in real-time or at another time. A node may determine when to retrieve the data based on one or more factors including, but not limited to: an assigned priority of a node, an assigned priority of the data or package, a bandwidth of a network connection between nodes, a determined speed of a connection, an expected transfer speed, a determined transfer speed, a number of connections, other network metrics, any other factor, or any combination thereof.

In some embodiments, a custom retrieval scheme may be implemented in a node to allow a user or other computer to specify which node or nodes should be used to retrieve or disseminate packages, manifests, data, or other objects. A custom retrieval scheme could also specify when specific packages, or types of packages, may be retrieved and could associate a specified delay with packages, such as a pre-determined delay based on the type of package to be retrieved or disseminated. The custom retrieval scheme may also specify one or more lengths of delay.

In an example, if a node assigns almost no delay for when to retrieve the data (such as a highest priority or a fast connection), such as by a delay indicator like the number one (1), the node may proceed to retrieve the data almost immediately, at 410. If the node has determined to implement a delay (such as a lower priority or slower connection) for retrieving the data, at 408, then the process 405 may proceed, at 412, to implement a delay or wait time, at 414. Further, the node may assign a delay indicator (such as greater than 1) to implement a delay in retrieving the data or to prioritize multiple pending retrievals; for example, a larger delay indicator may correspond to a longer the delay. However, a node may have a maximum delay that may override the delay indicator once the maximum delay has been reached. An amount of time of a delay may be pre-determined, set by a user, or may be determined by the node based on one or more factors, such as an assigned priority of a node, an assigned priority of the data or package, a bandwidth of a network connection between nodes, a determined speed of a connection, an expected transfer speed, a determined transfer speed, a number of connections, other network metrics, any other factor, or any combination thereof.

After the delay, the process 405 may determine a next delay indicator of data to be retrieved, at 416. For example, the process 405 may adjust a value indicating an associated delay and then retrieve the data that is associated with adjusted value indicating the new delay. When data is associated with a selected delay, the process 405 may proceed to retrieve the data, at 417. When the data is not associated with the currently selected delay, the process 405 may determine if a maximum delay (i.e. time out) has been reached, at 418. When the maximum delay has been reached, the maximum delay may allow the node to retrieve the data regardless of the delay indicator and proceed to retrieving the data, at 419. When the maximum delay has not been reached, at 418, the process 405 may implement another delay, at 414, and proceed through the process 405 until the data is retrieved. Delays may be represented within a node or system by multiple levels that the process 405 may advance through to allow implementation of different lengths of delays ranging from almost no delay to a maximum delay time; though, multiple levels of delay and a maximum delay time are not required to be implemented.

In accordance with various embodiments, the methods described herein may be implemented as one or more software programs running on a computer processor, controller, or other control circuit. Dedicated hardware implementations including, but not limited to, application specific integrated circuits, programmable gate arrays, and other hardware devices can likewise be constructed to implement the systems and methods described herein. The systems and methods described herein can be applied to any type of system or computer that transfers data over a network.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

The illustrations and examples provided herein are but a few examples of how the present disclosure can be applied to data storage systems. There are many other contexts in which the methods and systems described herein could be applied to computing systems and data storage systems. For example, the methods and systems described herein are particularly useful for low bandwidth networks or networks imposing a bandwidth limit on a user or on data transmissions.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Accordingly, the disclosure and the figures are to be regarded as illustrative and not restrictive.

What is claimed is:

1. A method comprising:
   processing at a first node in a network:
   receiving a notification at the first node, the notification indicating that data is available for the first node to retrieve, the notification received from a second node;
   selecting a first selected node of multiple nodes in the network to retrieve a first portion of the data from, where the first node is operable to retrieve the data from any node within the network that has the data;
   selecting a second selected node of the multiple nodes to retrieve a second portion of the data from, the second selected node different from the first selected node;
   determining a priority of the first portion of the data from multiple levels of priority, where a lower priority includes a longer delay than a higher priority;
   selecting a first time delay at the first node to delay sending a request to retrieve the first portion of the data from the first selected node based on a first delay indicator;
   selecting a second time delay at the first node to delay sending a request to retrieve the second portion of the data from the second selected node;
   when the first time delay has expired, making a first request for the first portion of the data from the first selected node;
   when the second time delay has expired, making a first request for the second portion of the data from the second selected node;
   requesting the first portion of the data after an additional delay when the data is associated with a second delay indicator;
   repeating the first time delay based on the priority, where the first delay indicator indicates a higher priority than the second delay indicator, and a third delay indicator indicates a lower priority than the second delay indicator, and the third delay indicator is associated with a longer delay than the second delay indicator; and
   requesting the data when the additional delay has reached a limit of a maximum delay.

2. The method of claim 1 further comprising determining if the first node needs to receive the data prior to selecting the first selected node to retrieve the first portion of the data and the second selected node to retrieve the second portion of the data.

3. The method of claim 1 further comprising:
   selecting the first selected node to retrieve the first portion of the data from and the second selected node to retrieve the second portion of the data from based on one or more factors associated with the network; and
   retrieving the first portion of the data from the first selected node and the second portion of the data from the second selected node.

4. The method of claim 1 further comprising determining the first time delay and the second time delay and selecting the first selected node and the second selected node based on one or more of the following: a priority of a node, a data transfer speed of a connection in the network, a priority of the data, a bandwidth of a connection in the network, and a number of connections from the first node to other nodes in the network.

5. The method of claim 1 further comprising notifying at least one other node in the network that the data is available from the first node.

6. The method of claim 1 further comprising:
   repeating the method until all data in a package is retrieved, the package including all portions of the data that have changed from a previous version of the data at the first node; and
   applying the package to the first node when all data that is part of the package is received.

7. The method of claim 6 wherein the package further comprises the notification, a manifest listing portions of the data that have changed from a previous version of the data, and the portions of the data listed in the manifest.

8. The method of claim 1 further comprising retrieving the first portion of the data and the second portion of the data from nodes other than the second node.

9. A device comprising:
   a first node including:
      an interface for receiving and sending data;
      a memory;
      a controller coupled to the memory, the controller configured to:
         receive a notification, the notification indicating that data is available for the first node to retrieve, the notification received from a second node;
         retrieve a manifest from a first selected node of multiple nodes in a network, the manifest containing metadata listing changes to a file, the data including the changes to the file;
         select a second selected node of the multiple nodes in the network to retrieve the data from, where the first node is operable to retrieve the data from any node within the network that has the data, including the second node;
         determine a priority of the data from multiple levels of priority, where a lower priority includes a longer delay than a higher priority;
         calculate a first time delay at the first node to delay sending a request to retrieve the data from the second selected node based on a first delay indicator;
         when the first time delay has expired, request the data from the second selected node;

request the data after an additional delay when the data is associated with a second delay indicator;

repeat the first time delay based on the priority, where the first delay indicator indicates a higher priority than the second delay indicator, and a third delay indicator indicates a lower priority than the second delay indicator, and the third delay indicator is associated with a longer delay than the second delay indicator; and request the data when the additional delay has reached a limit of a maximum delay.

10. The device of claim 9 wherein the controller is further configured to:

determine retrieval options of the multiple nodes that the first node is operable to retrieve the manifest and the data from; and select the first selected node and the second selected node to retrieve the data from based on the retrieval options.

11. The device of claim 10 wherein the controller is further configured to:

repeat the additional delay based on multiple lengths of delay to extend a time period before requesting the data.

12. The device of claim 9 wherein the controller is further configured to:

retrieve a first portion of the data from the second selected node;

retrieve a second portion of the data from a third selected node; and apply the data to a corresponding file when the data is complete.

13. A device comprising:

a memory; and computer readable instructions stored in the memory that, when the instructions are executed by a processor, cause the processor to:

receive a notification, the notification indicating that data is available for the device to retrieve, the notification received from a second device;

select a first selected node of multiple nodes in the network to retrieve a first portion of the data from, where the device is operable to retrieve the data from any node within the network that has the data;

select a second selected node of the multiple nodes to retrieve a second portion of the data from, the second selected node different from the first selected node;

determine a priority of the first portion of the data from multiple levels of priority, where a lower priority includes a longer delay than a higher priority;

select a first time delay at the device to delay sending a request to retrieve the first portion of the data from the first selected node, the first time delay determined based on a first delay indicator;

select a second time delay at the device to delay sending a request to retrieve the second portion of the data from the second selected node;

when the first time delay has expired, request the first portion of the data from the first selected node;

request the first portion of the data after an additional delay when the data is associated with a second delay indicator;

repeat the first time delay based on the priority, where the first delay indicator indicates a higher priority than the second delay indicator, and a third delay indicator indicates a lower priority than the second delay indicator, and the third delay indicator is associated with a longer delay than the second delay indicator;

request the first portion of the data when the additional delay has reached a limit of a maximum delay; and when the second time delay has expired, request the second portion of the data from the second selected node.

14. The device of claim 13 wherein instructions further cause the processor to:

select one of the multiple nodes to retrieve the first portion or the second portion of the data from based on one or more factors.

15. The device of claim 13 wherein instructions further cause the processor to:

when the first delay has expired, determine whether to add the additional delay to the first delay based on multiple levels of priority.

16. The device of claim 13 wherein instructions further cause the processor to:

store a list of nodes that have the data available to retrieve; and send a notice to at least one node in the network to notify the at least one node of an existence of the data.

17. The device of claim 13 wherein instructions further cause the processor to:

retrieve a manifest from a third selected node of multiple nodes, the manifest listing changed portions of a file, the first portion of the data and the second portion of the data including the changed portions of the file.

* * * * *